UNITED STATES PATENT OFFICE 2,171,472

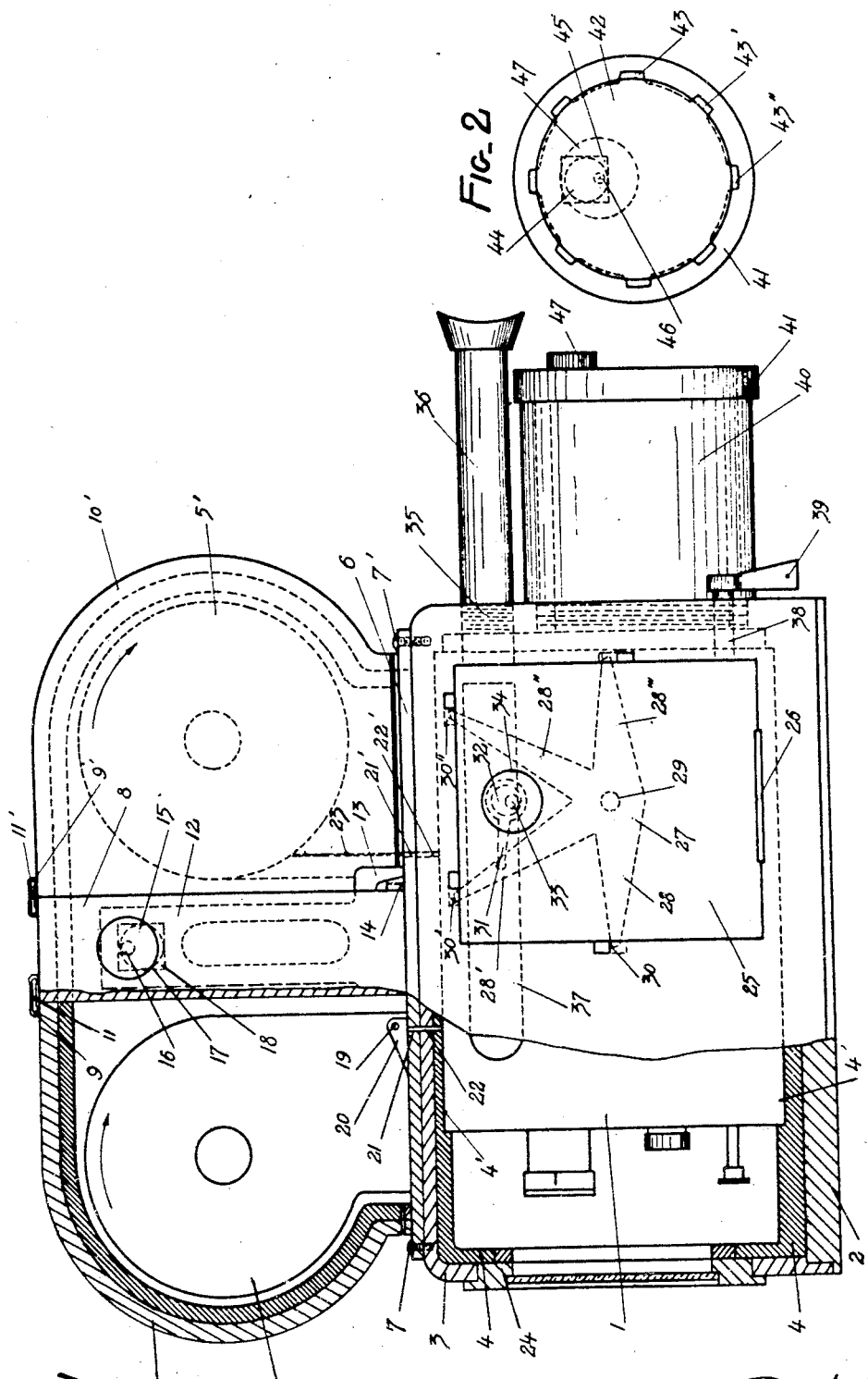

MOVING PICTURE CAMERA

Maurice Albert Dalotel, Deuil, France, assignor to Suzanne Rosalie Mathot, Paris, France Application June 21, 1938, Serial No. 215,013
In France June 29, 1937

4 Claims. (Cl. 88—17)

The present invention relates to a moving picture camera and its main object is to prevent the noises issued from the camera mechanism, from the driving motor and from the movement of the film to exert an objectionable effect on the sound recording apparatus. It has already been proposed to this effect to build the housing of the camera of an acoustically insulating material and to suspend the various mechanisms of the camera elastically inside said housing, but this causes firstly a complication of the structure and then, it only prevents quite inefficiently the transmission of the mechanism noises towards the outside through the various control and adjusting means passing through the wall of the housing. It has also been proposed to place the entire camera, together with the film casings inside an acoustically insulating box which may be removed, or which is fitted with convenient apertures for loading the camera, but the devices of this sort, realized up to the present day, are cumbersome, difficult to transport, and do not permit the loading of the camera with the desirable rapidity and ease.

The apparatus object of the present invention is designed to remedy to these drawbacks, and it is characterized by the fact that the sound proof insulating cover is constituted by a box of moulded material, preferably lined with rubber on the inside and consisting in a base plate and a hood moulded in one single piece, the camera being fixed in a convenient manner to said base plate and to the upper part of the hood, which is further covered by a casing, also of moulded material fixed externally in a detachable manner to said upper part of the hood, which casing may be opened and forms the housing of the two film magazines of the camera.

By way of example, there has been described below and represented on the annexed drawing an embodiment of the apparatus according to the invention:

Figure 1 is a view, partly in elevation and partly in longitudinal section.

Figure 2 is a partial end view from the right side.

Referring to Figure 1, the moving picture 1 of any normal type, the operation of which has been rendered by construction as silent as possible, is located inside of a sound proof insulating box constituted by a base plate 2 and a hood 3, the box preferably consisting in a moulded material lined on the inside by a rubber layer 4. The camera 1 is maintained inside the soundproof box by fitting into the rectangular slots 4', 4" provided on the surface of the rubber layer of the base plate 2 of the box and of that of the upper flap of the hood 3, between which the camera is firmly clamped in position. On the upper part of the hood 3 is mounted a removable housing adapted to receive the film magazines 5, 5' of the camera 1. This housing, also of moulded material, is constituted by a supporting plate 6 which may be fixed by means of four screws 7, 7' . . . to the hood 3 and integral with a central post 8 to which are hinged in 9, 9' two shells 10, 10' which may be lifted by pivoting about the hinges 9, 9' for loading the camera, and which may be clamped in the opened position by means of the grooves 11, 11' in which the pivoting axis may slide. The two shells 10, 10' are locked in their closed position shown on the drawing by means of two flat metal parts, such as 12' sliding vertically in the lateral grooves provided in the post 8 and comprising at their lower ends lugs 13 engaging behind corresponding projections 14 provided on the lower edge of the shells 10, 10' which are thus firmly held against the central post 8. The two parts 12 are actuated by eccentrics 15 keyed to a transverse shaft 16 journalled in the post 8 and actuated by button 17, the eccentrics being located in rectangular apertures 18 provided in the sliding parts 12. The magazine casings 5, 5' are fixed inside the housing by means of removable pins 19 engaging the lateral rings 20 fixed to the supporting plate 6. The supporting plate 6 and the upper part of the hood 3 to which it is fixed, are provided with slots 21, 22 and 21', 22' for allowing the film 23 to pass.

The hood 3 is provided in front with a laterally hinged glass window 24 and, on one side, with a full door 25 pivoted about the horizontal hinge 26 and permitting the access of the adjusting and control means of the camera 1. The closing of these doors is made perfect by means of a rubber seam and the doors are further provided with a number of locking means distributed around their periphery and actuated by means of a single button. This arrangement, which has been represented on the drawing for the lateral door 25, consists of a flat metal part 27 with a number of arms 28, 28', 28" . . . mounted on an axis 29 and movable in a slot in the body of the door, the ends of the arms 28 engaging, when the door is being closed, in notches 30, 30', 30" . . . provided on the surface of the hood. The rotation of part 27 is controlled by a small link 31 actuated by an eccentric 32 keyed to the shaft 33 of a small actuating button 34.

At the rear side, the hood 3 carries a threaded aperture 35 into which is screwed the normally removable part 36 of the focussing lens, the aperture 35 being located in a manner that this part of the lens comes to lie exactly in the produced direction of part 37 of the lens, which is integral with the camera 1. All the adjustments of the camera, when the latter is stopped, are effected through the front door and the side door of the hood, with the same ease as if the hood were not present. The starting, stopping, focussing, actuating of the ground glass and diaphragms, rotation of the camera by hand are effected from the outside, with the hood closed, by means of simple push rods or handles, such as 38, 39 which normally are not in contact with the camera. Lastly, a cylindric housing 40, also of moulded material, lined with rubber and acting as a housing for the camera driving motor, is screwed in the rear side of the hood; the motor is carried at one end by the camera 1 and does not come into contact, at any moment, with the sound proof housing 40. The housing is provided with a tight closing lid 41, the closing of which is obtained by a device similar to that of the hood doors and comprising a rotating disc 42 (Figure 2) provided with pins 43, 43', 43" ... engaging with corresponding notches adapted on the edge of the housing 40. The disc is actuated by an eccentric 44 located in a rectangular aperture 45 of the disc keyed to the shaft 46 of an actuating button 47.

What I claim is:

1. Sound insulating box made of plastic material lined with rubber for motion picture cameras, consisting of three detachable parts comprising a base plate, a removable hood moulded in one piece and a magazine housing removably mounted on the upper flap of said hood and comprising a supporting plate, a central post integral with said plate and two shells hinged on said central post, two slits provided in the upper flap of the hood and in the supporting plate of the magazine housing for the passage of the film, rectangular recesses provided in the rubber lining of the base plate and of the upper flap of the hood which closely fit around the top and bottom of the camera, a glass door in the front wall of the hood facing the object lens of the camera and a door for the access to the camera in the side wall of said hood.

2. Sound insulating box made of plastic material lined with rubber for motion picture cameras, consisting of three detachable parts comprising a base plate, a removable hood moulded in one piece and a magazine housing removably mounted on the upper flap of said hood and comprising a supporting plate, a central post integral with said plate and two shells hinged on said central post, two slits provided in the upper flap of the hood and in the supporting plate of the magazine housing for the passage of the film, rectangular recesses provided in the rubber lining of the base plate and of the upper flap of the hood which closely fit around the top and bottom of the camera, a glass door in front wall of the hood facing the object lens of the camera and a door for the access to the camera in the side wall of said hood, a cylindrical housing forming the motor compartment removably fixed on the rear wall of the hood, a cover closing the rear end of said cylindrical compartment.

3. Sound insulating box made of plastic material lined with rubber for motion picture cameras, consisting of three detachable parts comprising a base plate, a removable hood moulded in one piece and a magazine housing removably mounted on the upper flap of said hood and comprising a supporting plate, a central post integral with said plate, two shells provided with transverse horizontal hinges for pivoting them on the forward upper edge and on the rear upper edge of the central post respectively, means for locking said shells in the lifted position, these latter means comprising two lateral plates sliding vertically to either side of the central post, a transverse shaft journalled in the post and provided with a control knob, on this shaft an eccentric for controlling the vertical displacements of said plates, pins provided at the lower edges of these plates and notches formed on the lower edges of the shells and engaging with said pins, two slits provided in the upper flap of the hood and in the supporting plate of the magazine housing for the passage of the film, rectangular recesses provided in the rubber lining of the base plate and of the upper flap of the hood which closely fit around the top and bottom of the camera, a glass door in the front wall of the hood facing the object lens of the camera and a door for the access to the camera in the side wall of said hood.

4. Sound insulating box made of plastic material lined with rubber for motion picture cameras, consisting of three detachable parts comprising a base plate, a removable hood moulded in one piece and a magazine housing removably mounted on the upper flap of said hood and comprising a supporting plate, a central post integral with said plate and two shells hinged on said central post, two slits provided in the upper flap of the hood and in the supporting plate of the magazine housing for the passage of the film, rectangular recesses provided in the rubber lining of the base plate and of the upper flap of the hood which closely fit around the top and bottom of the camera, a glass door in the front wall of the hood facing the object lens of the camera and a door for the access to the camera in the side wall of said hood, means for locking said doors comprising a slot provided in the body of each door, a flat member adapted to rotate within said slot and provided with pins extending outside the door, notches provided in the edges of the opening closed by the door and engaging with said pins, a knob controlling the rotation of the locking flat part.

MAURICE ALBERT DALOTEL.